United States Patent
Wang

(10) Patent No.: US 8,881,407 B2
(45) Date of Patent: Nov. 11, 2014

(54) MULTIFUNCTIONAL PRUNING SHEARS FOR ONE STEP CUTTING AND STEP BY STEP CUTTING

(71) Applicant: Green Guard Industry Ltd., Taichung (TW)

(72) Inventor: Kuang-Pin Wang, Taichung (TW)

(73) Assignee: Green Guard Industry Ltd., Taichung (TW)

( * ) Notice: Subject to any disclaimer, the term of this patent is extended or adjusted under 35 U.S.C. 154(b) by 172 days.

(21) Appl. No.: 13/761,341

(22) Filed: Feb. 7, 2013

(65) Prior Publication Data

US 2014/0215834 A1 Aug. 7, 2014

(51) Int. Cl.
*B26B 13/00* (2006.01)

(52) U.S. Cl.
USPC .................................. 30/251; 30/199; 30/194

(58) Field of Classification Search
USPC .......... 30/251, 196, 194, 199, 220, 221, 203, 30/244, 248, 249
See application file for complete search history.

(56) References Cited

U.S. PATENT DOCUMENTS

| | | | | | |
|---|---|---|---|---|---|
| 2,512,334 | A | * | 6/1950 | Johnson | 30/251 |
| 2,520,905 | A | * | 9/1950 | Borrelli | 30/237 |
| 4,176,450 | A | * | 12/1979 | Muromoto | 30/92 |
| 5,159,757 | A | * | 11/1992 | Weid et al. | 30/251 |
| 5,511,314 | A | * | 4/1996 | Huang | 30/251 |
| 5,544,416 | A | * | 8/1996 | Lin | 30/193 |
| 6,199,284 | B1 | * | 3/2001 | Nilsson et al. | 30/250 |
| 6,345,446 | B1 | * | 2/2002 | Huang | 30/250 |
| 6,418,626 | B1 | * | 7/2002 | Jang | 30/262 |
| 6,493,943 | B1 | * | 12/2002 | Linden | 30/252 |
| 6,640,442 | B2 | * | 11/2003 | Lin | 30/251 |
| 6,748,663 | B2 | * | 6/2004 | Linden | 30/249 |
| 6,789,324 | B2 | * | 9/2004 | Linden et al. | 30/245 |
| 6,829,829 | B1 | * | 12/2004 | Huang | 30/252 |
| D503,595 | S | * | 4/2005 | Lipscomb et al. | D8/5 |
| 6,938,346 | B1 | * | 9/2005 | Huang | 30/250 |
| D634,994 | S | * | 3/2011 | Huang | D8/5 |
| 7,946,039 | B2 | * | 5/2011 | Erbrick | 30/251 |
| 8,225,513 | B2 | * | 7/2012 | Huang | 30/254 |
| 8,327,549 | B2 | * | 12/2012 | Huang | 30/251 |
| 8,458,912 | B2 | * | 6/2013 | Linden et al. | 30/131 |
| 8,679,140 | B2 | * | 3/2014 | Butcher | 606/157 |
| 8,732,960 | B2 | * | 5/2014 | Wang | 30/244 |
| 2004/0064954 | A1 | * | 4/2004 | Schmidt | 30/251 |
| 2007/0079512 | A1 | * | 4/2007 | Nelson et al. | 30/123.3 |
| 2008/0282549 | A1 | * | 11/2008 | Lin | 30/194 |
| 2008/0289186 | A1 | * | 11/2008 | Adams | 30/92 |
| 2009/0044412 | A1 | * | 2/2009 | Hsieh | 30/252 |
| 2009/0293288 | A1 | * | 12/2009 | Hernandez | 30/251 |
| 2009/0313835 | A1 | * | 12/2009 | Erbrick | 30/251 |
| 2010/0043237 | A1 | * | 2/2010 | Linden et al. | 30/250 |

(Continued)

*Primary Examiner* — Sean Michalski
(74) *Attorney, Agent, or Firm* — Wang Law Firm, Inc.; Li K. Wang; Stephen Hsu

(57) ABSTRACT

A multifunctional pruning shears for one step cutting and step by step cutting wherein a first cutting section, a first connection section and a first pivot section are disposed to a front section of a first scissor body of a first driving member; a second driving member has a second connection section; a front section of a second scissor body has a second cutting section, a driven section and a second pivot section; and the driven section is driven by a first linkage and a second linkage to prevent the pruning shears from being damaged due to excessive force imposing.

4 Claims, 8 Drawing Sheets

(56) References Cited

U.S. PATENT DOCUMENTS

2011/0126415 A1\* 6/2011 Huang .......................... 30/254
2011/0154668 A1\* 6/2011 Liu et al. ........................ 30/252
2012/0151781 A1\* 6/2012 Huang ........................... 30/251
2013/0031786 A1\* 2/2013 Wang ............................. 30/251

\* cited by examiner

MULTIFUNCTIONAL PRUNING SHEARS FOR ONE STEP CUTTING AND STEP BY STEP CUTTING

BACKGROUND OF THE INVENTION

1. Field of the Invention

The invention relates to a pruning shears, and more particularly to a multifunctional pruning shears for one step cutting and step by step cutting.

2. Description of the Related Art

Pruning shears are a cutting tool for trimming plant trunks. Pruning shears available on the market can be divided into two types, one step cutting or step by step cutting, wherein the one step cutting type is formed at first lever type. Since applied force imposes an equal resisting force, the advantage is a quick single motion cut off and can be suitable for easily cutting softer trunks or thinner trunks. Cutting thicker, hard trunks requires greater force. If applied force is insufficient, the trunks may not be cut off in one motion and the shears must repeatedly cut at the same cutting point to gradually cut off the trunk. Consequently, physical effort may be exhausted, and trimming efficiency is reduced. If step by step cutting type is performed, proper locations can be selected to perform step by step cutting during a stop block among many stop positions. The foregoing manner can save force to achieve the effect of convenient cutting. However, when the stop block is powerfully pressed to move among the stop positions, the pruning shears may be easily damaged due to the pressing location that is momently displaced among stop positions.

SUMMARY OF THE INVENTION

Therefore, it is a primary objective of the present invention to provide multifunctional pruning shears for one step cutting and step by step cutting. The structure of conventional pruning shears is taken as a basis, and a second linkage is added to the conventional pruning shears. In a process of one step cutting, the first linkage on the stop position drives the driven section for moving. However, before the first linkage is moved to other stop positions, the second linkage continuously drives the driven section. Accordingly, when the first linkage is merely dislocated without imposing pressure while moving to other stop positions, the aforementioned construction can prevent the pruning shears from being damaged due to any applied force while moving to other stop positions.

To achieve the foregoing objective, the pruning shears comprise a first driving member, a first scissor body disposed to one end of a first gripping section of the first driving member, a front end of the first scissor body having a first cutting section, a rear end of the first scissor body having a first connection section connected to the first gripping section, a first pivot section disposed between the first cutting section and the first connection section; a second driving member, a second connection section disposed to one end of a second gripping section of the second driving member; a second scissor body, a front section of the second scissor body having a second cutting section correspondingly cutting with the first cutting section, a rear section of the second scissor body having a driven section, a second pivot section disposed between the second cutting section and the driven section, the second pivot section and the second connection section respectively pivoted to the first pivot section at two relatively sides of the second pivot section and the second connection section, the driven section having at least two stop positions recessed and adjoined to each other, a first driving portion disposed to the driven section; a first linkage having a first pivot end and a leaning end located at two opposite ends of the first linkage, the first pivot end pivoted to the second connection section, the leaning end leaning against and pressing at any stop position to drive the second cutting section to approach the first cutting section so as to cut under segmentation condition, a restoring element capable of retaining the leaning end at the stop position when the driven section is relatively near the second connection section; a second linkage having a second pivot end pivoted to the second connection section and having a second driving portion connected to the first driving portion, capable of replacing the first linkage to continuously press the driven section such that the second cutting section is driven to approach the first cutting section to perform one step cutting, the second driving portion capable of dragging the driven section to allow the second cutting section to be distant from the first cutting section

BRIEF DESCRIPTION OF THE DRAWINGS

The detailed structure, operating principle and effects of the present invention will now be described in more details hereinafter with reference to the accompanying drawings that show various embodiments of the invention as follows.

DETAILED DESCRIPTION OF THE PREFERRED EMBODIMENTS

The technical content of the present invention will become apparent by the detailed description of the following embodiments and the illustration of related drawings as follows.

With reference to FIG. 1 to FIG. 8, the structures shown in the figures are embodiment selected by the invention and taken as depiction only and shall not be restricted in patent application.

Figure 1:
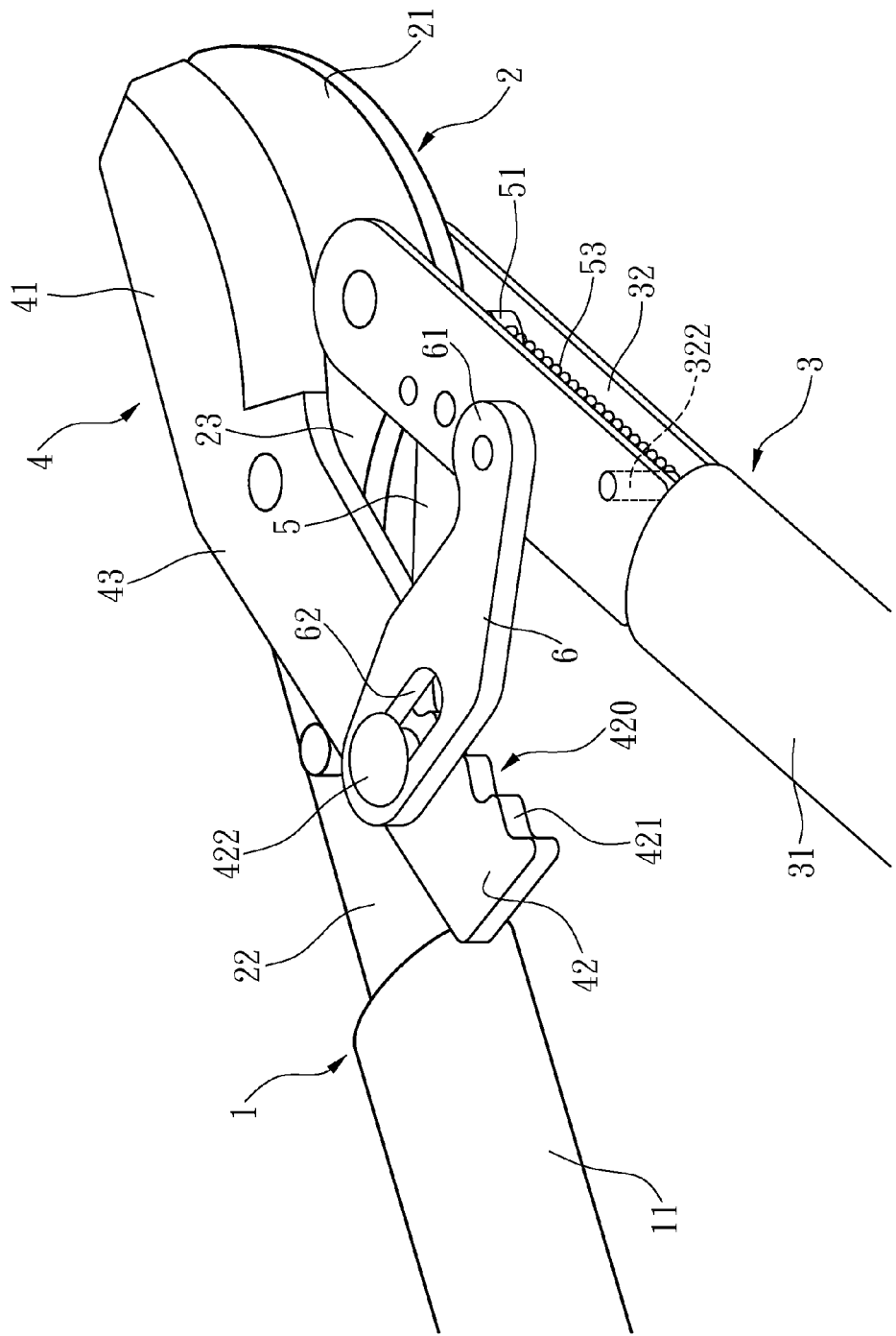
FIG. 1 is a three-dimensional appearance drawing of the invention.

The embodiment provides a pruning shears for one step cutting and step by step cutting, as shown in FIG. 1, comprising a first driving member 1, a first scissor body 2, a second driving member 3, a second scissor body 4, a first linkage 5 and a second linkage 6.

As shown in FIG. 1 to FIG. 4, the first driving member 1 has a first gripping section 11. The first scissor body 2 is fastened to an end of the first gripping section 11. A front section of the first scissor body 2 has a first cutting section 21, and a rear section of the first scissor body 2 has a first connection section 22. The first connection section 22 is connected to the first gripping section 11. A first pivot section 23 is between the first cutting section 21 and the first connection section 22.

As shown in FIG. 1 to FIG. 4, the second driving member 3 has a second gripping section 31. One end of the second gripping section 31 has a second connection section 32. The front section of the second scissor body 4 has a second cutting section 41. The second cutting section 41 can be relatively cut with the first cutting section 21. A rear section of the second scissor body 4 has a driven section 42. A second pivot section 43 is between the second cutting section 41 and the driven section 42. The second pivot section 43 and the second connection section 32 are respectively pivoted to the first pivot section 23 at relatively two sides. In the embodiment, the driven section 42 has a working side surface 420. The working side surface 42 is toward the second connection section 32 and formed with at least two stop positions 421 at open state. Four stop positions 421 are formed herein. The four stop positions 421 are recessed and mutually adjoined. A first driving portion is disposed to the driven section 42. The first driving portion in the embodiment is a block rod 422 and protrudes the surface of the driven section 42.

Figure 2:
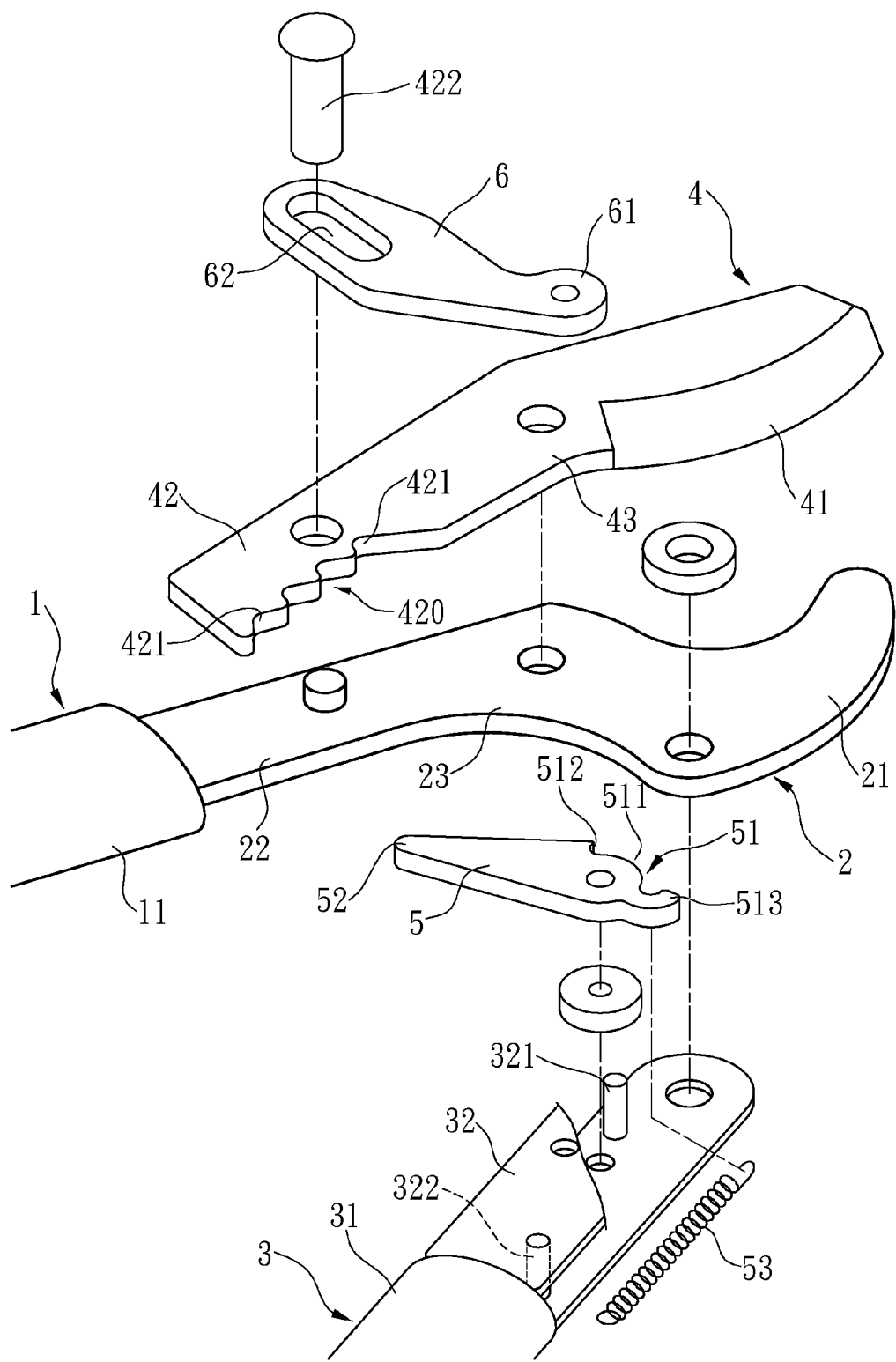
FIG. 2 is a decomposition drawing of the invention.
Figure 3:
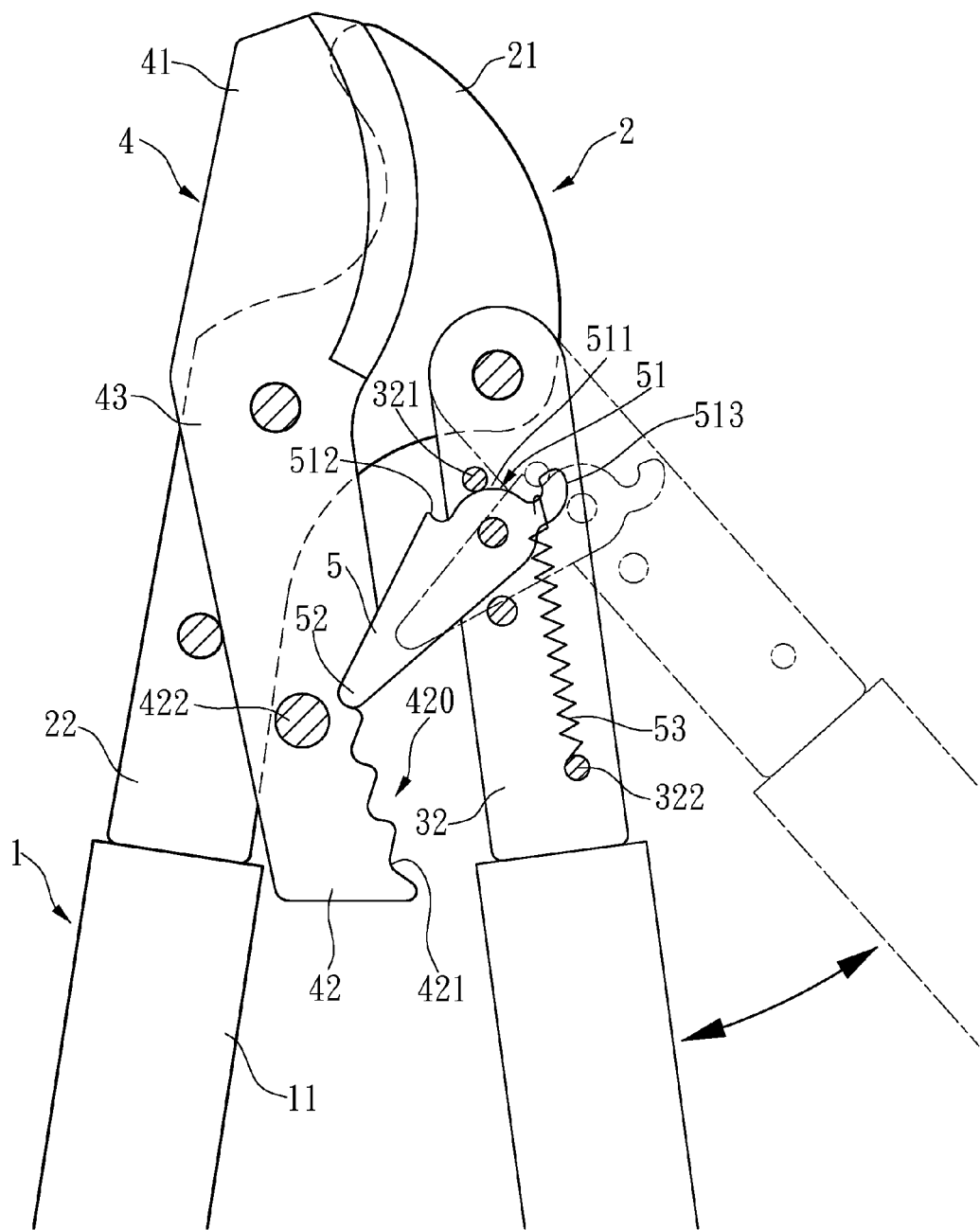
FIG. 3 is a schematic diagram of a driven section driven by the first linkage of the invention.

As shown in FIG. 1 to FIG. 3, the first linkage 5 has a first pivot end 51 and a leaning end 52 located at two opposite ends. The first pivot end 51 is pivoted to the second connection section 32. In the embodiment, the leaning end 52 can be close to and lean against any stop position 421 of the driven section 42 and could be pressed to drive the second cutting section 41 to approach the first cutting section 21. A restoring element is disposed between the first pivot end 51 and the second connection section 32 such that the leaning end 52 can be retained and lean against the stop position 421 when the driven section 42 is relatively approached to the second connection section 32.

As shown in FIG. 1 to FIG. 3, the first pivot end 51 of the first linkage 5 is recessed with a guide trench 511 having strokes toward a side direction. One end of the guide trench 511 has a blocking portion 512 that is close to the second scissor body 4. Another end of the guide trench 511 is formed with a hook portion 513 that is distant from the second scissor body 4. The blocking portion 512 and the hook portion 513 of the first linkage 5 are pivoted to the second connection section 32 to be near the first pivot section 23. A first positioning rod 321 is fastened to the second connection section 32 and passes through guide trench 511. A second positioning rod 322 is fastened to the second connection section 32 and near the second gripping section 31. The restoring element is an expansion spring 53. One end of the expansion spring 53 is fastened to the hook portion 513 while another end of the expansion spring 53 is fastened to the second positioning rod 332. The first pivot end 51 is pulled by the expansion spring 53 and is blocked at the first positioning rod 321 in the guide trench 511 through the blocking portion 512.

Figure 4:
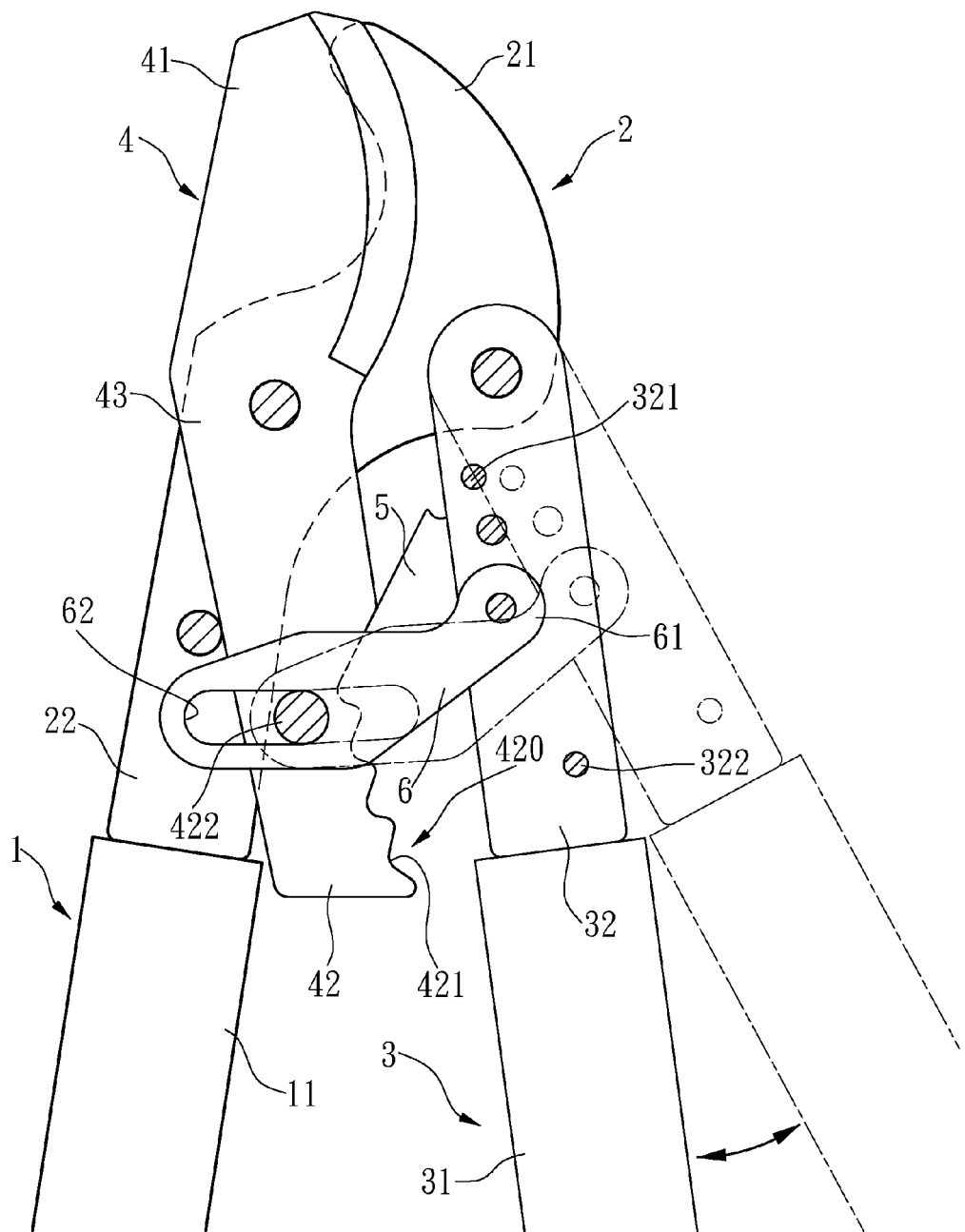
FIG. 4 is a schematic diagram of a driven section driven by the second linkage of the invention.

As shown in FIG. 1, FIG. 2 and FIG. 4, the second linkage 6 has a second pivot end 61 pivoted to the second connection section 32 and has a second driving portion connected to the first driving portion to press the driven section 42, thereby driving the second cutting section 41 near the first cutting section 21. The second driving portion can drive the driven section such that the second cutting section 41 is distant from the first cutting section 21. In the embodiment, the second driving portion is a rectangular hole 52. The block rod 422 passes through the rectangular hole 62. The second linkage 6 forwardly pushes the block rod 422 through a rear end of the rectangular hole 62 so that the second cutting portion 41 is near the first cutting section 21. The second linkage 6 backwardly pulls the block rod 422 through a front end of the rectangular hole 62 such that the second cutting section 41 is distant from the first cutting section 21.

Figure 5:
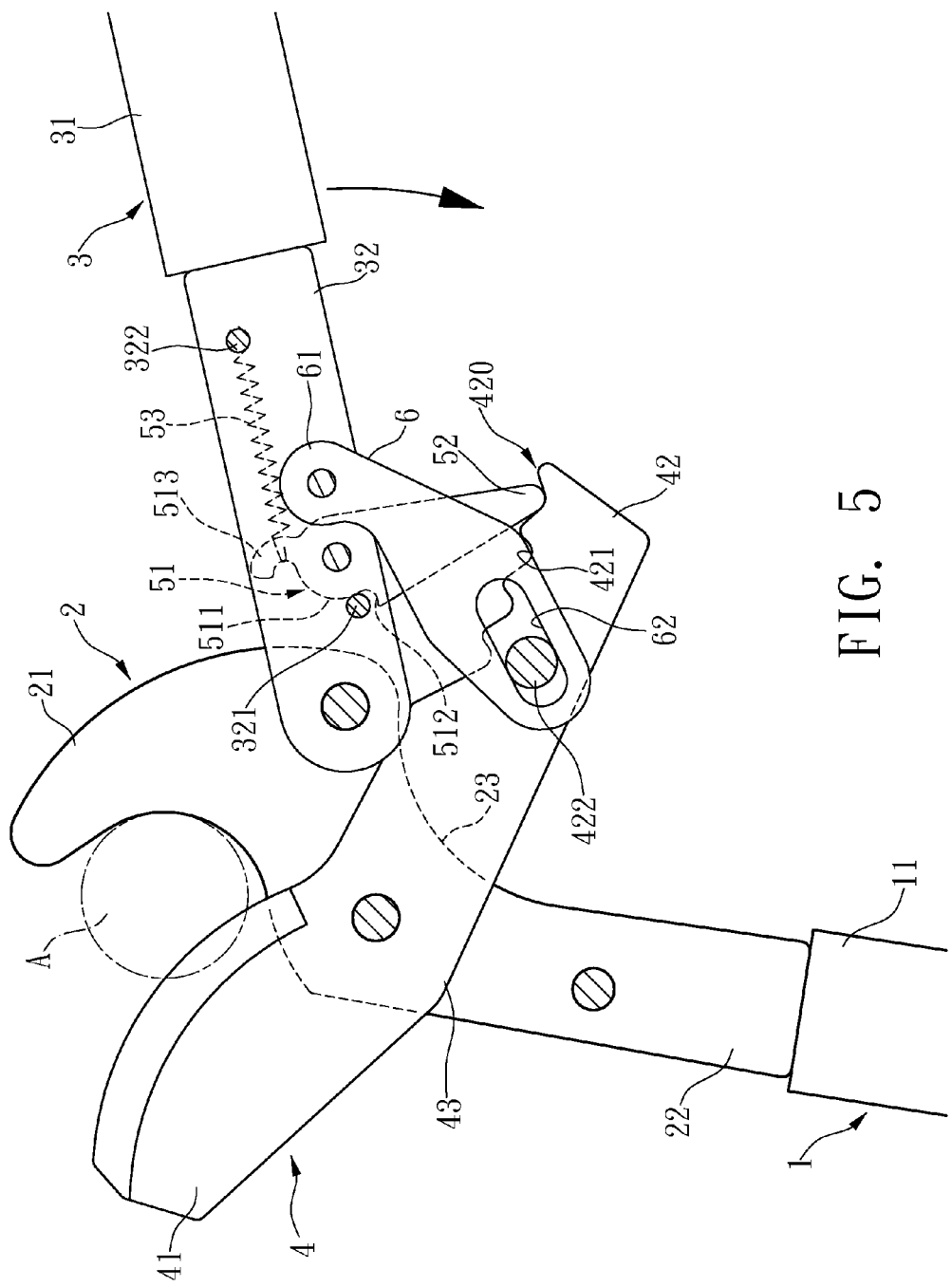
FIG. 5 is a motion schematic diagram for cutting trunks step by step during a first cut of the invention.
Figure 6:
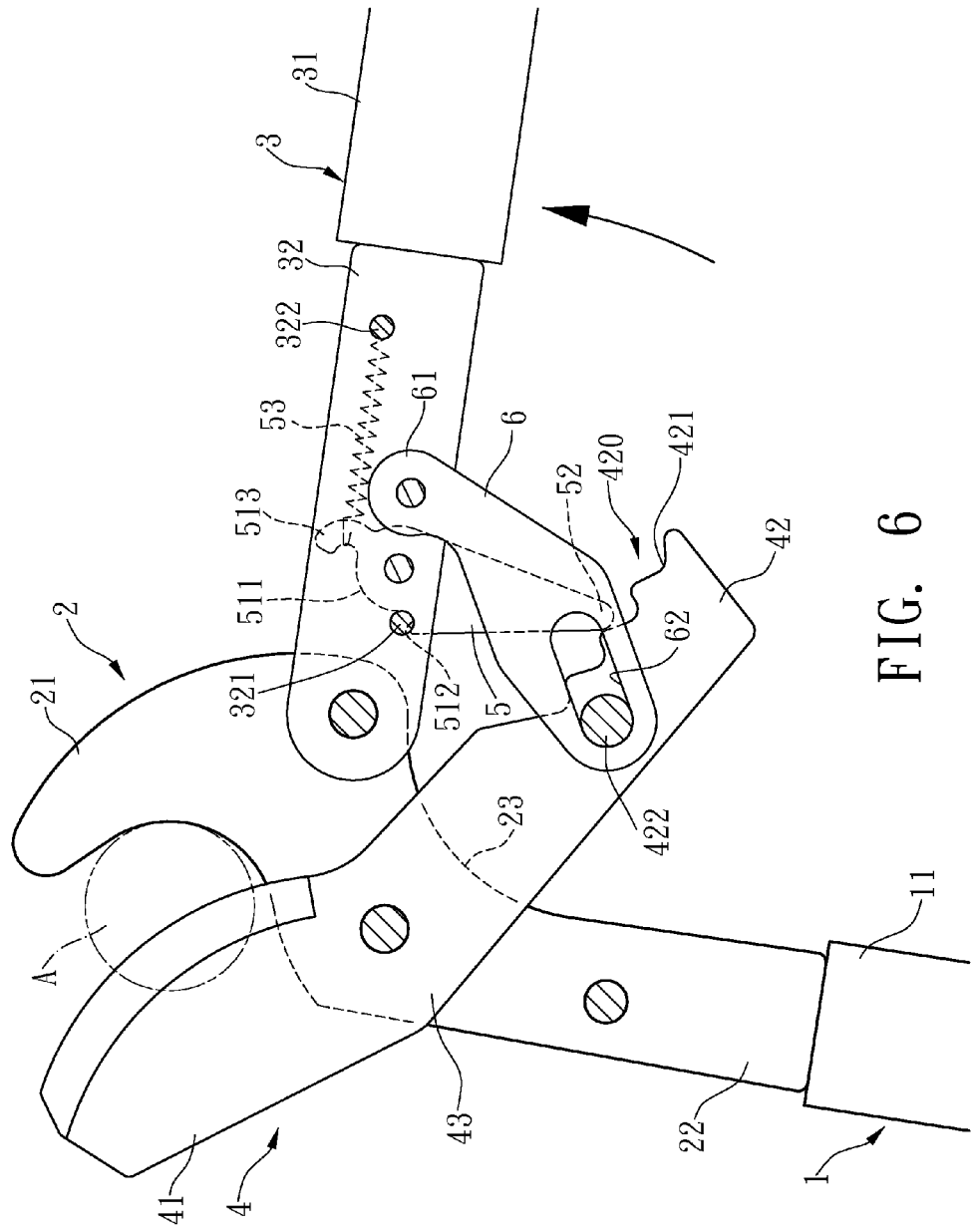
FIG. 6 is a motion schematic diagram for cutting trunks step by step after a first cut of the invention.

When the pruning shears shown in the embodiment is in use, the first gripping section 11 and the second gripping section 31 are held by hands to open the first cutting section 21 and the second cutting section 41 accordingly. At this time, the cut trunk and branches are moved to the gap formed by opening the first cutting section 21 and the second cutting section 41. As shown in FIG. 5, if the trunk to be cut is a thicker hardness trunk A, it can be cut by step. At this time, the user can use both hands to hold and impose force on the first gripping section 11 and the second gripping section 31. Since the leaning end 52 of the first linkage 5 leans against the stop position 421 near the end portion of the driven section 42, the force arm pressing on the driven section 42 is longer. The first cutting section 21 and the second cutting section 41 can easily scissor the trunk A. While shearing a proper degree, as shown in FIG. 6, the first gripping section 11 and the second gripping section 31 can be opened such that the first linkage 5 is moved to the stop positions 421 at the end portion of the driven section 42. Although the force arm is shortened, the trunk A has been cut to form the thinner trunk. Therefore, the trunk A can be easily cut off.

Figure 7:
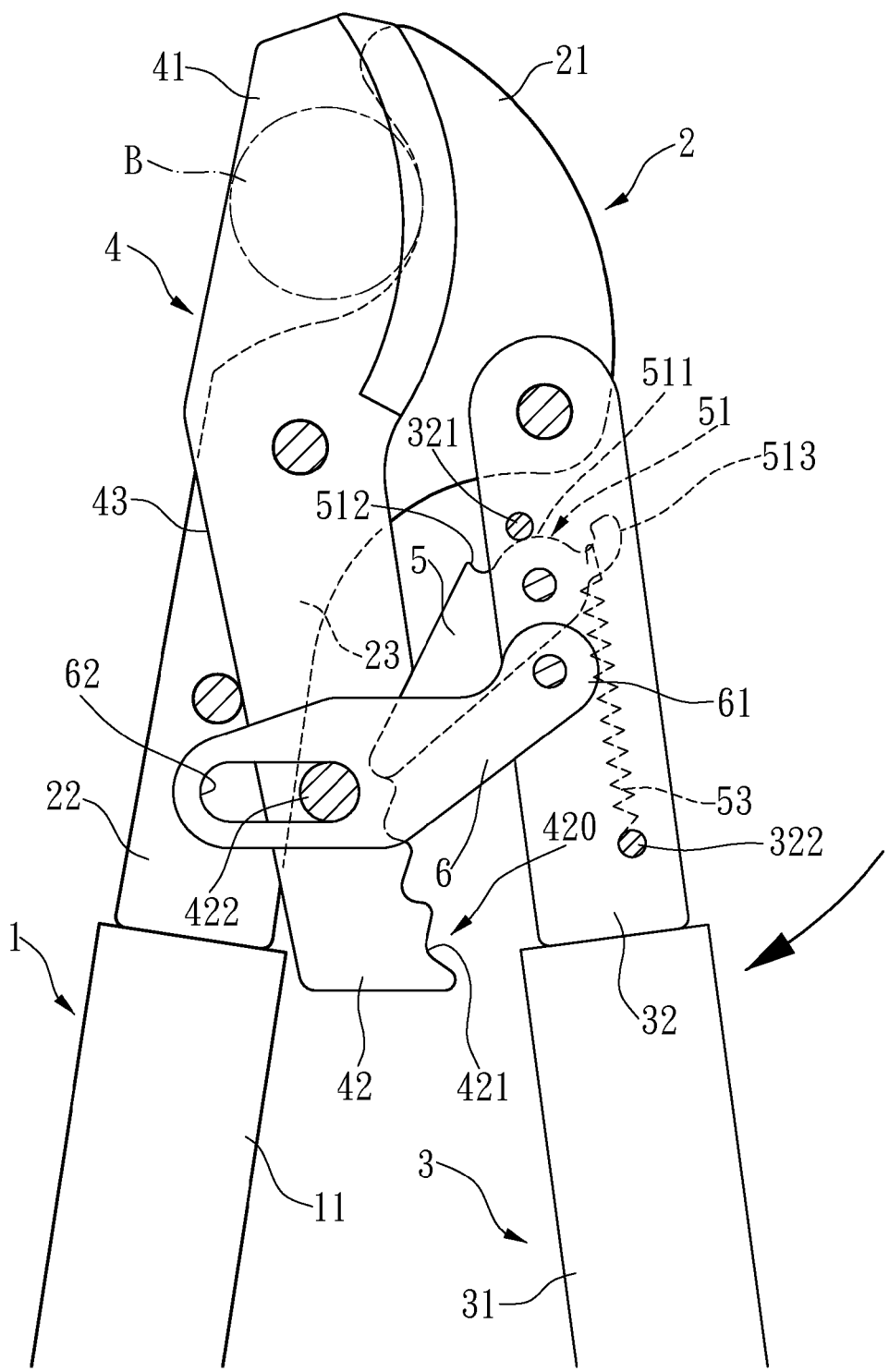
FIG. 7 is a motion schematic diagram for cutting trunks step by step.

As shown in FIG. 7, if a softer trunk B (or a thinner hardness trunk) needs to be cut, a one step cutting form can be selected. In other words, the user holds the first gripping section 11 and the second gripping section 31 to directly impose force. Initially, the leaning end 52 of the first linkage 5 leans against the stop position 421 of the driven section 42. When the rear end of the rectangular hole 62 of the second linkage 6 leans against the block rod 422, the second linkage 6 drives the driven section 42 until the trunk B is cut off.

Figure 8:
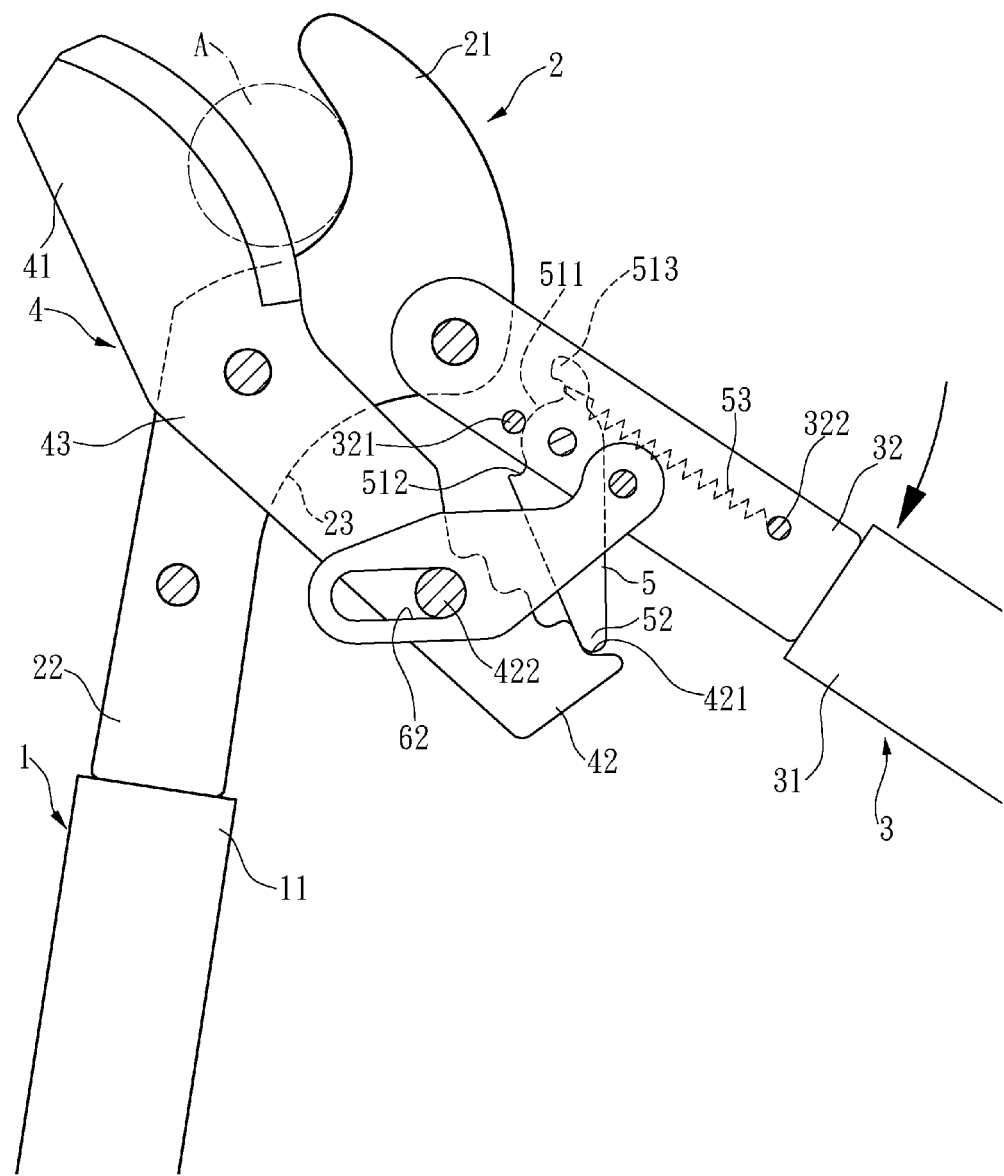
FIG. 8 is a schematic diagram of the driven section driven by the second linkage from the first linkage.

With reference to FIG. 8, it should be noted herein regardless of step by step cutting or one step cutting formations, when the leaning end 52 of the first linkage 5 leans against the stop position 421 to press and driving the driven section, the block rod 422 on the surface of the driven section 42 is displaced in the rectangular hole 62 of the second linkage 5. Before the leaning end 52 of the first linkage 5 is continuously pressed to jump between the stop positions 421, the rear end of the rectangular hole 62 instantly leans against the block rod 422. The first linkage 5 drives the driven section 42 if the pressure is imposed once again. Accordingly, the pruning shears of the invention, which differs from the conventional pruning shears, is increased with the second linkage 6. When one step cutting is performed through the second linkage 6, the first linkage 6 is taken over to drive the driven section 42 such that the leaning end 52 which jumps among the stop positions 421 is not received with force, and the driven section 42 is continuously pressed to complete cutting motion. Therefore, the leaning end 52 can be prevented from jumping among the stop positions 421 under a condition of powerfully imposing forces, and the pruning shears can be further prevented from being damaged by abrasion due to improper force imposing.

While the means of specific embodiments in the present invention has been described by reference drawings, numerous modifications and variations could be made thereto by those skilled in the art without departing from the scope and spirit of the invention set forth in the claims. The modifications and variations should in a range limited by the specification of the present invention.

What is claimed is:

1. A multifunctional pruning shears for one step cutting and step by step cutting, comprising:
    a first driving member, a first scissor body disposed to one end of a first gripping section of the first driving member, a front end of the first scissor body having a first cutting section, a rear end of the first scissor body having a first connection section connected to the first gripping section, a first pivot section disposed between the first cutting section and the first connection section;

a second driving member, a second connection section disposed to one end of a second gripping section of the second driving member;

a second scissor body, a front section of the second scissor body having a second cutting section correspondingly cutting with the first cutting section, a rear section of the second scissor body having a driven section, a second pivot section disposed between the second cutting section and the driven section, the second pivot section and the second connection section respectively pivoted to the first pivot section at two relatively sides of the second pivot section and the second connection section, the driven section having at least two stop positions recessed and adjoined to each other, a first driving portion disposed to the driven section;

a first linkage having a first pivot end and a leaning end located at two opposite ends of the first linkage, the first pivot end pivoted to the second connection section, the leaning end leaning against and pressing at any stop position to drive the second cutting section to approach the first cutting section so as to cut under a condition of step by step cutting, a restoring element capable of retaining the leaning end at the stop position when the driven section relatively approaches the second connection section; and a second linkage having a second pivot end pivoted to the second connection section and having a second driving portion connected to the first driving portion, capable of replacing the first linkage to continuously press the driven section such that the second cutting section is driven to approach the first cutting section to perform one step cutting, the second driving portion capable of dragging the driven section to allow the second cutting section to be distant from the first cutting section.

2. The multifunctional pruning shears for one step cutting and step by step cutting of claim 1, wherein the driven section has a working side surface, and the working side surface is toward the second connection section and formed with at least two stop positions, and the leaning end approaches any stop position of the driven section to perform pressing.

3. The multifunctional pruning shears for one step cutting and step by step cutting of claim 2, wherein the first pivot end of the first linkage is recessed with a guide trench having strokes toward a side direction, and one end of the guide trench has a blocking portion that is near the second scissor body, and another end of the guide trench is formed with a hook portion that is distant from the second scissor body, and the blocking portion and the hook portion of the first linkage are pivoted to the second connection section to be near the first pivot section, and a first positioning rod is fastened to the second section and passes through the guide trench, and a second positioning rod is fastened to the second connection section and near the second gripping section; and the restoring element is an expansion spring, and one end of the expansion spring is fastened to the hook portion, and another end of the expansion spring is fastened to the second positioning rod, and the first pivot end is pulled by the expansion spring and blocked at the first positioning rod in the guide trench through the blocking portion.

4. The multifunctional pruning shears for one step cutting and step by step cutting of claim 2, wherein the first driving portion is a block rod protruded a surface of the driven section, and the second driving portion is a rectangular hole, and the block rod passes through the rectangular hole, and the second linkage forwardly pushes the block rod through a rear end of the rectangular hole so that the second cutting portion is near the first cutting section, and the second linkage backwardly pulls the block rod through a front end of the rectangular hole such that the second cutting section is distant from the first cutting section.

* * * * *